(12) United States Patent
Champel et al.

(10) Patent No.: US 10,057,661 B2
(45) Date of Patent: Aug. 21, 2018

(54) METHOD AND APPARATUS FOR TRANSMISSION AND RECEPTION OF MEDIA DATA

(71) Applicant: THOMSON LICENSING, Issy les Moulineaux (FR)

(72) Inventors: Mary-Luc Champel, Marpire (FR); Alexandre Deceneux, Rennes (FR); Celine Guede, Cesson Sevigne (FR); Julien Ricard, Plouër-sur-Rance (FR); Joan Llach Pinsach, Cesson-Sevigne (FR); Franck Aumont, Rennes (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/323,385

(22) PCT Filed: Jun. 25, 2015

(86) PCT No.: PCT/EP2015/064358
§ 371 (c)(1),
(2) Date: Dec. 30, 2016

(87) PCT Pub. No.: WO2016/001051
PCT Pub. Date: Jan. 7, 2016

(65) Prior Publication Data
US 2017/0155975 A1    Jun. 1, 2017

(30) Foreign Application Priority Data

Jun. 30, 2014 (EP) ..................... 14306052

(51) Int. Cl.
*H04N 5/445* (2011.01)
*H04N 21/8543* (2011.01)
(Continued)

(52) U.S. Cl.
CPC ......... *H04N 21/8543* (2013.01); *H04L 67/02* (2013.01); *H04N 21/2362* (2013.01);
(Continued)

(58) Field of Classification Search
CPC ............... H04N 21/43; H04N 21/4302; H04N 21/4305; H04N 21/4307; H04N 21/431;
(Continued)

(56) References Cited

U.S. PATENT DOCUMENTS 9,854,298 B2 * 12/2017 Keum ............... H04N 21/43615
2013/0086213 A1   4/2013 Rhyu et al.
(Continued)

OTHER PUBLICATIONS

Park et al., "Text of ISO-IEC CD23008-11 MPEG Media Transport CI", International Organization for Standardization, ISO/IEC JTC1/SC29/WG11, Coding of Moving Pictures and Audio, MPEG/N13717, Vienna, Austria, Aug. 2013, pp. 1-45.
(Continued)

*Primary Examiner* — James R Sheleheda
(74) *Attorney, Agent, or Firm* — Jeffrey M. Navon (57) ABSTRACT

The invention concerns providing for each media package a plurality of spatial composition datasets defining the initial spatial rendering of the media entities of the media package and for each spatial composition datasets a plurality of temporal composition datasets. The invention may be applied to MMT data.

15 Claims, 4 Drawing Sheets

(51) Int. Cl.
    *H04L 29/08*     (2006.01)
    *H04N 21/2362*     (2011.01)
    *H04N 21/2368*     (2011.01)
    *H04N 21/234*     (2011.01)
    *H04N 21/845*     (2011.01)
    *H04N 21/435*     (2011.01)
    *H04N 21/431*     (2011.01)
    *H04N 21/43*     (2011.01)

(52) U.S. Cl.
    CPC ... *H04N 21/2368* (2013.01); *H04N 21/23412* (2013.01); *H04N 21/4307* (2013.01); *H04N 21/4312* (2013.01); *H04N 21/4358* (2013.01); *H04N 21/8456* (2013.01)

(58) Field of Classification Search
    CPC ........... H04N 21/4312; H04N 21/8456; H04N 21/845
    See application file for complete search history.

(56) References Cited

U.S. PATENT DOCUMENTS

| | | |
|---|---|---|
| 2014/0019408 A1 | 1/2014 | Ryu et al. |
| 2014/0040963 A1* | 2/2014 | Keum .............. H04N 21/43615 725/78 |
| 2014/0201609 A1* | 7/2014 | Ryu .................... G06F 17/2247 715/202 |
| 2014/0298157 A1* | 10/2014 | Lim .................... G06F 17/2247 715/234 |
| 2016/0073137 A1* | 3/2016 | Dewa ..................... H04H 20/28 725/116 |
| 2016/0267879 A1* | 9/2016 | Champel ............ H04N 5/44591 |
| 2017/0041423 A1* | 2/2017 | Kitazato ................ H04H 60/27 |
| 2017/0155975 A1* | 6/2017 | Champel ............ H04N 21/8543 |
| 2017/0344523 A1* | 11/2017 | Bouazizi ............... G06F 17/212 |
| 2018/0041820 A1* | 2/2018 | Xu ..................... H04N 21/8402 |
| 2018/0123711 A1* | 5/2018 | Kitazato ................ H04H 20/28 |

OTHER PUBLICATIONS

Ryu et al., "Proposed text for CI examples", International Organization for Standardization, ISO/IEC JTC1/SC29/WG11, Coding of Moving Pictures and Audio, MPEG2013/m30561, Vienna, Austria, Jul. 2013, pp. 1-20.

* cited by examiner

METHOD AND APPARATUS FOR TRANSMISSION AND RECEPTION OF MEDIA DATA

This application claims the benefit, under 35 U.S.C. § 365 of International Application PCT/EP2015/064358 filed Jun. 25, 2015, which was published in accordance with PCT Article 21(2) on Jan. 7, 2016, in English, and which claims the benefit of European Application No. 14306052.3 filed Jun. 30, 2014. The European and PCT applications are expressly incorporated by reference herein in their entirety for all purposes.

TECHNICAL FIELD

This invention relates to a method and an apparatus for transmission and reception of media data. Particularly, but not exclusively the invention relates to the transmission and reception of data for a media package, including for example MPEG type data, and a method and apparatus for rendering media content, on a display.

BACKGROUND

Media content such as image, graphics, text, audio and video data or any combination thereof can be delivered across communication networks and rendered on user terminals including media players and multimedia players.

Multimedia players are devices that render combinations of video, audio or data content for consumption by users. The rendering or reproduction of the media content may be performed by visible display, audio sound etc. When different media content entities are delivered to a user terminal in the form of multimedia, it is important to determine timing synchronization and the display positions of the media content components for effective consumption and presentation.

MPEG-H part 1 standard (also known as MPEG Multimedia Transport or MMT), for example defines a solution for packaging, transport and composition of timed and non-timed media content, such as for example, image data, audio data, text data and the like. While MMT primarily addresses IP networks, it also supports delivery of content over any type of packet-based networks. In particular, MMT may be used for delivery of audiovisual services over broadcast networks such as terrestrial, cable or satellite networks.

In MMT, the term "Asset" refers to a data entity containing data with the same transport characteristics and that is composed of one or more MPUs (media processing units) with same Asset ID, the term "Package" refers to a logical collection of data, which is composed of one or more Assets and their related Asset Delivery Characteristics (i.e., description about required Quality of Service for delivery of Assets), and Composition Information (CI) (i.e., description of spatial and temporal relationships between Assets).

MMT-CI (where CI refers to composition information) enables content providers to define the initial display composition of media data on a display and how the initial composition evolves with time. Indeed, MMT-CI specifies the relational arrangement between MMT assets for consumption and presentation and defines the following:
 spatial composition, i.e. the location of each asset rendered in a view;
 temporal composition i.e. the timing synchronization between media assets—evolution in time of the spatial composition;
 multiple views for supporting simultaneous display or virtual displays on one or more display devices The initial spatial composition is defined in a spatial composition data set, such as a HTML page associated with a MMT package, and the evolution in time of the composition is defined in a temporal composition dataset by means of CI elements described in XML fragments; The XML fragments may be sent separately over time.

The initial HTML page and the subsequent MMT-CI fragments are all associated with the same MMT package and are typically stored in the same package. While this does not present any issue with stored and finite duration media content, such system are unlikely to work with infinite duration contents (such as TV channels) since the HTML5 page is likely to significantly change from one program to another within the same TV channel. A potential solution could be to signal a TV channel as a succession of MMT packages (TV events, movies, ads, . . . ) each with their own HTML page and CI fragments but such an approach would result in significant amounts of signaling information and therefore a much higher receiver complexity.

Moreover, if CI is used for a broadcast channel, it is expected that many CI fragments will be sent. If the display information is very rich, both the HTML page and the CI fragments can be significantly large and a high number of areas per view multiplied by a high number of views would require significant processing in the receiver.

The present invention has been devised with the foregoing in mind.

SUMMARY

In one general aspect, the invention concerns providing for each media package a plurality of spatial composition datasets and for each spatial composition data sets a plurality of temporal composition datasets. A temporal composition data set may define the evolution in time of the initial spatial composition defined by the spatial composition dataset.

In another general aspect, the invention concerns providing a temporal composition dataset defining the temporal rendering (evolution in time of the spatial composition of display) of one or more media entities and an indicator indicating that a corresponding view of the display or area of view of display of media entities has changed with respect to a view defined in the preceding temporal composition dataset.

According to a first aspect of the invention there is provided a method of transmitting data for a media package, the media package comprising media data of one or more media entities for rendering on a display; the method comprising: transmitting, for each media package, a plurality of spatial composition data sets, each spatial composition data set defining a respective initial spatial rendering of said one or more media entities on the display, and for each spatial composition data set at least one corresponding temporal composition data set defining temporal, temporal rendering of said one or more media entities on the display.

According to a second aspect of the invention there is provided a method of processing data for a media package, the media package comprising media data of one or more media entities for rendering on a display; the method comprising:
 obtaining:
  for each media package, a plurality of spatial composition data sets, each spatial composition data set defining a respective initial spatial rendering of said one or more media entities on a display, and for each spatial composition data set at least one corresponding temporal composition data set defining the rendering in time (temporal rendering) of said one or more entities on the display; the method further comprising rendering the one or more media entities in accordance with the plurality of spatial composition data sets and the corresponding temporal composition data sets According to a third aspect of the invention there is provided a transmission device for transmitting data for a media package, the media package comprising media data of one or more media entities for rendering on a display; the device comprising:

a transmission module configured to transmit,
for each media package, a plurality of spatial composition data sets, each spatial composition data set defining a respective initial spatial rendering of said one or more media entities on a display, and
for each spatial composition data set at least one corresponding temporal composition data set defining the initial rendering in time of said one or more entities on the display.

According to a fourth aspect of the invention there is provided a device for processing data of a media package, the media package comprising media data of one or more media entities for rendering on a display; the device comprising:

a receiving module for receiving data including/associated with a media package
a module for extracting from the received data:
for each media package, a plurality of spatial composition data sets, each spatial composition data set defining a respective initial spatial rendering of said one or more media entities on a display, and
for each spatial composition data set at least one corresponding temporal composition data set defining the rendering in time of said one or more entities on the display;
a rendering engine for rendering the one or more media entities in accordance with the plurality of spatial composition data sets and the corresponding temporal composition data sets.

According to a fifth aspect of the invention there is provided a display device including a device for processing data of a media package, the media package comprising media data of one or more media entities for rendering on a display; the device comprising:

a receiving module for receiving data including/associated with a media package
a module for extracting from the received data:
for each media package, a plurality of spatial composition data sets, each spatial composition data set defining the spatial rendering of said one or more media entities on a display, and
for each spatial composition data set at least one corresponding temporal composition data set defining the temporal rendering of said one or more entities on the display;
a rendering engine for rendering the one or more media entities in accordance with the plurality of spatial composition data sets and the corresponding temporal composition data sets.

According to a sixth aspect of the invention there is provided a media data package comprising: media data of one or more media entities for rendering on a display; a plurality of spatial composition datasets, each spatial composition dataset comprising spatial composition data defining the spatial rendering of said one or more media entities; and for each spatial composition dataset: at least one corresponding temporal composition data set defining the rendering in time of said one or more media entities of the media data.

In an embodiment said one or more media entities are rendered in a view of the display, each view comprising one or more Areas wherein each spatial composition data defines the respective initial spatial composition of a view.

In an embodiment said one or more media entities are rendered in a view of the display, each view being time dependent, wherein the temporal composition data set includes an indicator indicating that a corresponding view has changed with respect to the view defined in the preceding temporal composition dataset.

A seventh aspect of the invention provides a method of transmitting data for a media package, the media package comprising media data of one or more media entities for rendering on a display; the method comprising:

transmitting,
for each media package, at least one spatial composition data set each spatial composition data set defining a respective initial spatial rendering of one or more media entities on a display, and
for each spatial composition data set at least one corresponding temporal composition data set defining the temporal rendering of said one or more media entities on the display,
wherein said one or more media entities are rendered in a view of the display, each view being time dependent, wherein the temporal composition data set includes an indicator indicating that a corresponding view has changed with respect to the view defined in the preceding temporal composition dataset.

An eighth aspect of the invention provides a method of processing data of a media package, the media package comprising media data of one or more media entities for rendering on a display; the method comprising:

obtaining:
for each media package, at least one spatial composition data set each spatial composition data set defining a respective initial spatial rendering of said one or more media entities on a display, and
for each spatial composition data set at least one corresponding temporal composition data set defining the temporal rendering of said one or more entities on the display; the method further comprising rendering the one or more media entities in accordance with the at least one spatial composition data sets and the corresponding temporal composition data set wherein said one or more media entities are rendered in a view of the display, each view being time dependent, wherein the temporal composition data set includes an indicator indicating that a corresponding view has changed with respect to the view defined in the preceding temporal composition dataset.

According to a ninth aspect of the invention there is provided a transmission device for transmitting data for a media package, the media package comprising media data of one or more media entities for rendering on a display; the device comprising:

a transmission module configured to transmit,
for each media package, a plurality of spatial composition data sets, each spatial composition data set defining a respective initial spatial rendering of said one or more media entities of the media package on the display, and for each spatial composition data set at least one corresponding temporal composition data set defining the temporal rendering of said one or more entities on the display.

According to a tenth aspect of the invention there is provided a device for processing data of a media package, the media package comprising media data of one or more media entities for rendering on a display; the device comprising:
    a receiving module for receiving data including/associated with a media package
    a module for extracting from the received data:
        for each media package, a plurality of spatial composition data sets, each spatial composition data set defining a respective initial spatial rendering of one or more media entities of the media package on a display, and
        for each spatial composition data set at least one corresponding temporal composition data set defining the temporal rendering of said one or more media entities on the display;
a rendering engine for rendering the one or more media entities in accordance with the plurality of spatial composition data sets and the corresponding temporal composition data sets, According to an eleventh aspect of the invention there is provided a display device comprising
    a device for processing data of a media package, the media package comprising media data of one or more media entities for rendering on a display; the device comprising:
    a receiving module for receiving data including/associated with a media package
    a module for extracting from the received data:
        for each media package, a plurality of spatial composition data sets, each spatial composition data set defining a respective initial spatial rendering of one or more media entities of the media package on a display, and
        for each spatial composition data set at least one corresponding temporal composition data set defining the temporal rendering of said one or more media entities on the display; and
a rendering engine for rendering the one or more media entities in accordance with the plurality of spatial composition data sets and the corresponding temporal composition data sets.

A twelfth aspect of the invention provides a media data package comprising:
media data of one or more media entities for rendering on a display; at least one spatial composition dataset, each spatial composition data comprising spatial composition data defining the spatial rendering of said one or more media entities; and for each spatial composition dataset, at least one corresponding temporal composition data set defining the temporal rendering of said one or more media entities of the media data, wherein said one or more media entities are rendered in a view of the display, each view being time dependent, wherein the temporal composition data set includes an indicator indicating that a corresponding view has changed with respect to the view defined in the preceding temporal composition dataset.

In an embodiment a plurality of spatial composition data set is provided for each media package. Each spatial composition data set may be a HTML page. Each temporal composition data set may be a CI fragment.

Features of embodiments of any of the twelve aspects of the invention are presented as follows:

In an embodiment, said one or more media entities are rendered in a view of the display, each view being time dependent and being composed of at least one display region wherein the temporal composition data set includes an indicator indicating that a display region has changed with respect to the display region defined in the preceding temporal composition dataset.

In an embodiment, each spatial composition dataset has a respective version identifier.

In an embodiment, the version identifier is included in the header of the respective spatial composition data set.

In an embodiment, each temporal composition data set includes an identifier of the corresponding spatial composition dataset In an embodiment, each temporal composition dataset is a CI fragment and the version number of the corresponding spatial composition dataset is inserted into the CI fragment at the same level as view and media sync elements of the CI fragment.

In an embodiment, the temporal composition data set is only processed for rendering of the media entities if the corresponding spatial composition dataset indicated by the version number is received.

In some embodiments of the invention the spatial composition datasets and the temporal composition datasets are comprised in MMT-CI (MPEG Media Transport CI)

In some embodiments of the invention each spatial composition dataset is a HTML document or page of MMT-CI. Each temporal composition dataset may be a CI fragment of MMT-CI. Each media entity may be a MMT media asset.

In some embodiments of the invention each temporal composition dataset defines: association between media entities of a media package; temporal information for rendering of the media entities on the display; and the mapping of the media entities to a display view.

In some embodiments of the invention each temporal composition data set is a CI fragment of MMT composition data.

According to a further aspect of the invention there is provided a method of transmitting a media package, the media package comprising media data of one or more media entities for rendering on a display; the method comprising: transmitting, for each media package, a plurality of spatial composition data sets, each spatial composition data set defining the spatial rendering of said one or more media entities on a display, and for each spatial composition data set at least one corresponding temporal composition data set defining temporal synchronization between the media assets.

In an embodiment the plurality of spatial composition data sets are initially transmitted.

In an embodiment of each spatial composition dataset has a respective identifier to link it with each corresponding temporal composition data set.

In an embodiment each view is time dependent, and the temporal composition data set includes an indicator indicating that a corresponding view has changed with respect to the view defined in the preceding temporal composition dataset.

Each spatial composition data set may be a HTML page. Each temporal composition data set may be a CI fragment.

According to a further aspect of the invention there is provided a method of processing a media package, the media package comprising media data of one or more media entities for rendering on a display; the method comprising: obtaining:
    for each media package, a plurality of spatial composition data sets, each spatial composition data set defining the spatial rendering of said one or more media entities on a display, and for each spatial composition data set at least one corresponding temporal composition data set defining the rendering in time (temporal rendering) of said one or more entities on the display; the method further comprising rendering the one or more media entities in accordance with the plurality of spatial composition data sets and the corresponding temporal composition data sets According to a further aspect of the invention there is provided a transmission device for transmitting a media package, the media package comprising media data of one or more media entities for rendering on a display; the device comprising:

a transmission module configured to transmit, for each media package, a plurality of spatial composition data sets, each spatial composition data set defining the spatial rendering of said one or more media entities on a display, and for each spatial composition data set at least one corresponding temporal composition data set defining the rendering in time of said one or more entities on the display.

According to a further aspect of the invention there is provided a device for processing a media package, the media package comprising media data of one or more media entities for rendering on a display; the device comprising:

a receiving module for receiving data including/associated with a media package a module for extracting from the received data:

for each media package, a plurality of spatial composition data sets, each spatial composition data set defining the spatial rendering of said one or more media entities on a display, and for each spatial composition data set at least one corresponding temporal composition data set defining the rendering in time of said one or more entities on the display;

a rendering engine for rendering the one or more media entities in accordance with the plurality of spatial composition data sets and the corresponding temporal composition data sets.

According to a further aspect of the invention there is provided a display device including a device for processing a media package, the media package comprising media data of one or more media entities for rendering on a display; the device comprising:

a receiving module for receiving data including/associated with a media package a module for extracting from the received data:

for each media package, a plurality of spatial composition data sets, each spatial composition data set defining the spatial rendering of said one or more media entities on a display, and for each spatial composition data set at least one corresponding temporal composition data set defining the temporal rendering of said one or more entities on the display;

a rendering engine for rendering the one or more media entities in accordance with the plurality of spatial composition data sets and the corresponding temporal composition data sets.

According to a further aspect of the invention there is provided a media data package comprising: media data of one or more media entities for rendering on a display; a plurality of spatial composition datasets, each spatial composition dataset comprising spatial composition data defining the spatial rendering of said one or more media entities; and for each spatial composition dataset: at least one corresponding temporal composition data set defining the rendering in time of said one or more media entities of the media data.

In an embodiment of any of the further aspects each spatial composition dataset has a respective identifier to link it with each corresponding temporal composition data set.

In an embodiment of any of the further aspects each view is time dependent, and the temporal composition data set includes an indicator indicating that a corresponding view has changed with respect to the view defined in the preceding temporal composition dataset At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RE signal.

BRIEF DESCRIPTION OF THE DRAWINGS

Embodiments of the invention will now be described, by way of example only, and with reference to the following drawings in which.

DETAILED DESCRIPTION

Embodiments of the invention will be described with respect to MPEG Multimedia Transport or MMT. In such embodiments a media package may be referred to as a MMT package and a media entity may be referred to as a MMT asset. It will be appreciated however that the invention may be applied to other techniques for transmission and rendering of media data.

Spatial composition in MMT is provided by HTML page technology, such as HTML 5 page technology and temporal composition is provided by a CI layer, typically described in XML. The CI layer is descriptive language extending the HTML5 page and defining the association of MMT assets in a MMT package as a resource of presentation, the temporal information needed for delivery and consumption order of MMT assets, and the mapping of MMT assets to a particular view.

Consequently, a typical MMT rendering engine first processes the HTML page associated with an MMT package containing MMT-CI and one or more MMT assets in order to define the initial spatial composition of the MMT assets and then parses CI data to control the presentation of the MMT assets in time.

Figure 1:
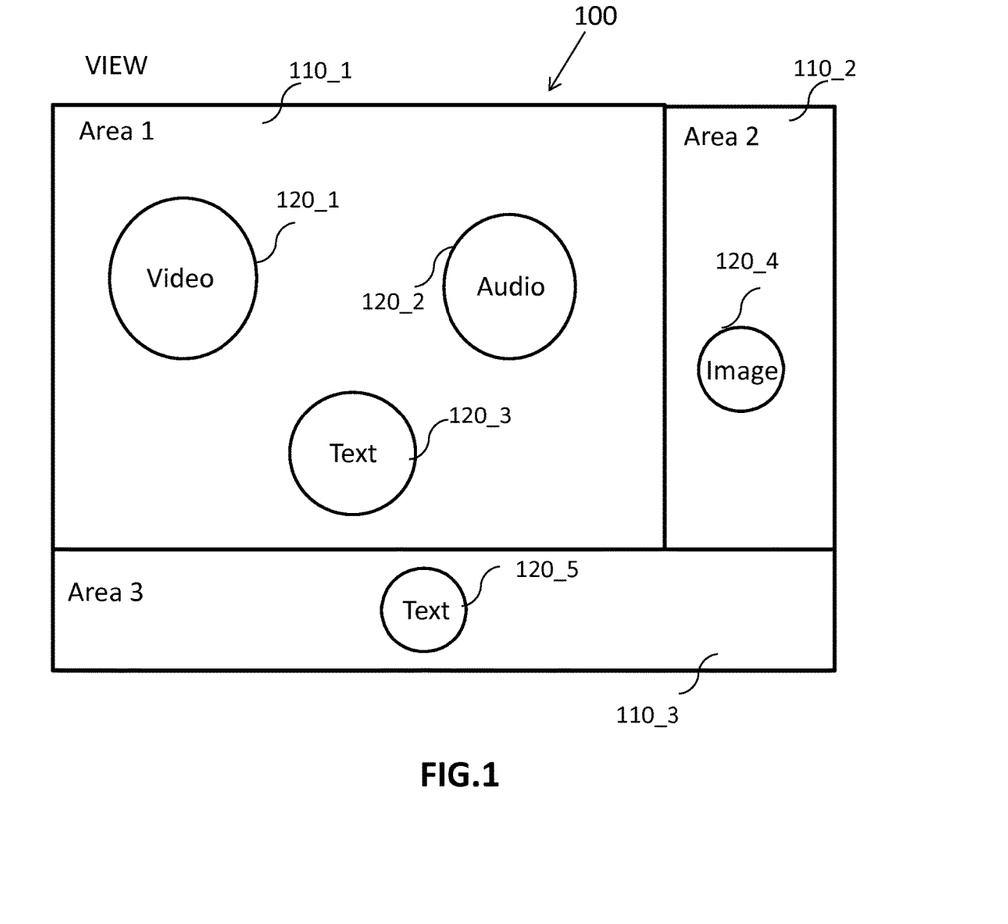
FIG. 1 schematically illustrates an example of a view of MMT-CI.

FIG. 1 schematically illustrates an example of a view in MMT-CI. A view 100 represents a whole display region which may be composed of one or more Areas or subregions. In the illustrated example the view is divided into three sub-regions 110_1, 110_2 and 110_3 named Area 1, Area 2 and Area 3 respectively. One or more MMT media assets 120_1 . . . 120-5 are rendered in each Area. The content and asset arrangement in the view may change in time in accordance the associated CI data.

Figure 2:
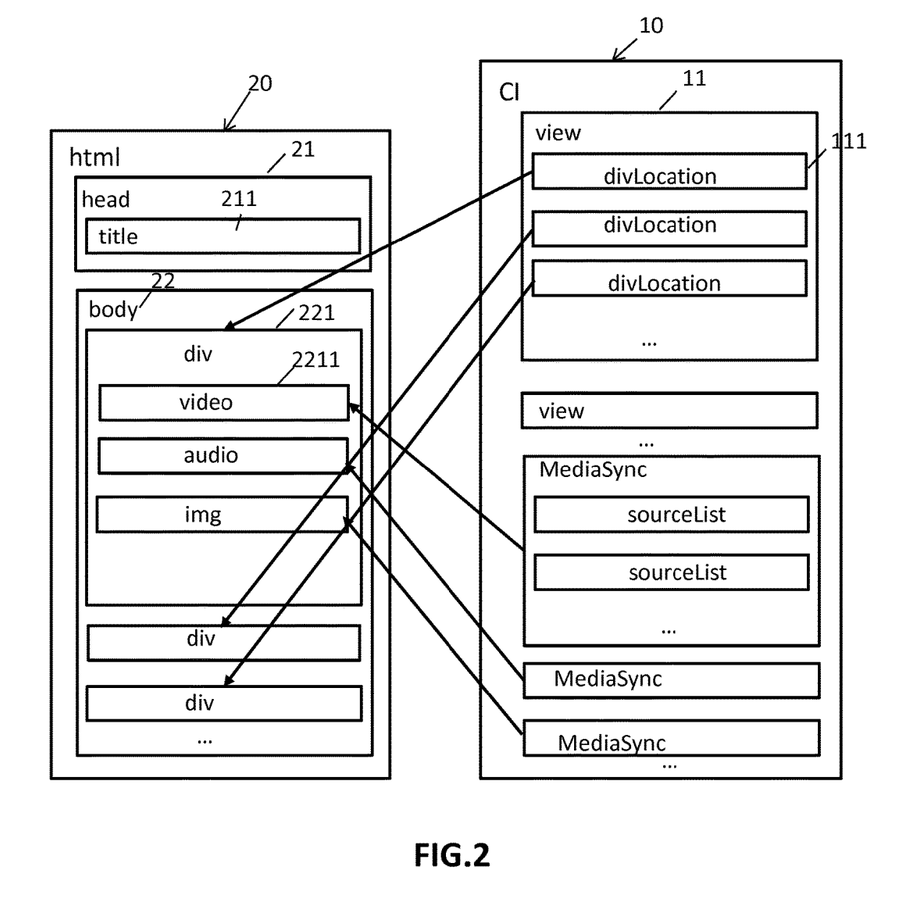
FIG. 2 schematically illustrates an example of the basic structure of CI fragment of MMT-CI and its relationship with a corresponding HTML document of MMT-CI.

MMT-CI describes the spatial and temporal relationship in a MMT Package in terms of Assets, Area and a View. FIG. 2 schematically illustrates an example of the basic structure of CI, 10 associated with an MMT package and its relationship with a HTML5 page, 20 associated with the MMT package. As illustrated, the basic structure of the CI file is derived from the structure of the HTML 5 document.

The root element of MMT-CI is the html element 20, which contains two elements such as head and body elements 21 and 22. Some elements in the head and body elements 21, 22 are extended or added in order to meet the requirements of MMT-CI.

In the described example the HTML element is a HTML 5 page. Head element 21 of the HTML5 page 20 contains a title element 211 to provide information about the MMT package.

The body element 22 includes div elements 221 which contain MMT Asset elements 2211 such as video, audio, img, text etc. The div element 221 provides spatial information about an Area. The MMT Asset 2211 (video, audio . . . ): provides spatial and temporal information of a MMT Asset.

A View element 11 provides spatial and temporal information about a View. A divLocation element 111 provides temporally changed special information about an Area of a view.

The div elements in the HTML5 page represent the initial Areas of a View that can be consumed by a single MMT display. The temporal change of the initial Areas in the View can be later specified in the view element of the CI layer (which provides update information about Views and Areas) by means of the divLocation element of CI document. These two elements allow the spatial location of Areas to be dynamically changed and updated without reloading a entire View page.

Basically a HTML page enables an initial view of a MMT package to be described and the MMT-CI enables the view to be updated and new additional views to be created. Updates may include spatial or temporal modification of the view, introduction of new views, or introduction of new assets. The MediaSync element in the CI layer provides temporal information (usually synchronization info) on the media assets.

Embodiments of the invention for providing composition data for media data will be described with reference to FIGS. 3 to 6.

Figure 3:
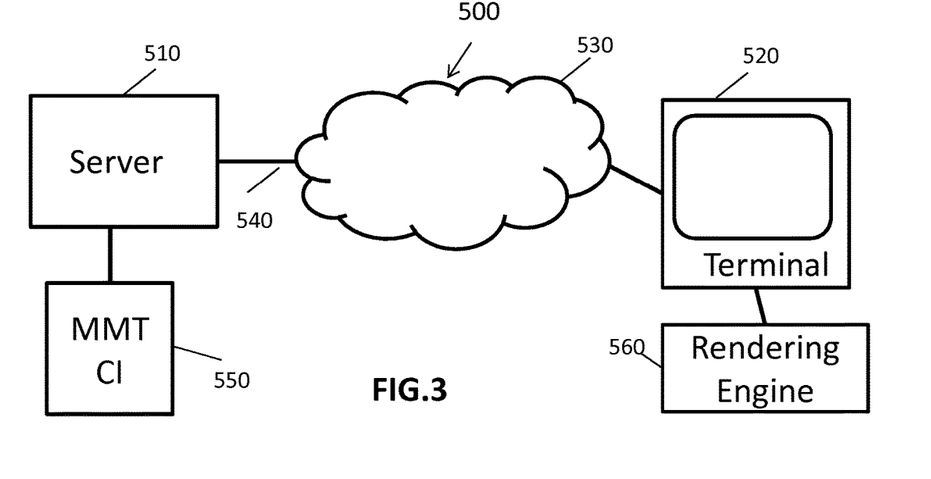
FIG. 3 is a block diagram of an example of a data communication system in which one or more embodiments of the invention can be implemented.

FIG. 3 schematically illustrates a data communication system in which one or more embodiments of the invention may be implemented. The data communication system 500 comprises a transmission device, in this case a server 510, which is operable to transmit data packets of a data stream to a receiving device, in this case a client terminal 510, via a data communication network 530. The data communication network 530 may be a Wide Area Network (WAN) or a Local Area Network (LAN). Such a network may be for example a wireless network (Wifi I 802.IIa or b or g), an Ethernet network, an Internet network or a mixed network composed of several different networks. In a particular embodiment of the invention the data communication system may be a digital television broadcast system in which the server 510 sends the same data content to multiple clients 520.

The data stream 540 provided by the server 510 comprises multimedia data representing video and audio data transmitted in the form of MMT packages with composition information. Multi-media data includes data of various types of media data, such as images, audio and text (character strings) The composition information defines temporal/spatial arrangement data of the multi-media assets. The temporal/spatial arrangement data determines the reproduction timing and reproduction form for each component or media entity of the media data, i.e. the temporal/spatial arrangement, for example when to reproduce the media data and/or in what position to display the media data. In embodiments of the invention spatial composition data for each MMT package includes a plurality of spatial composition data sets in the form of HTML pages defining the spatial rendering on a display of the media assets of the MMT package, and for each HTML page a plurality of temporal composition data sets in the form of XML data, defining the temporal synchronisation between the media assets.

Figure 4:
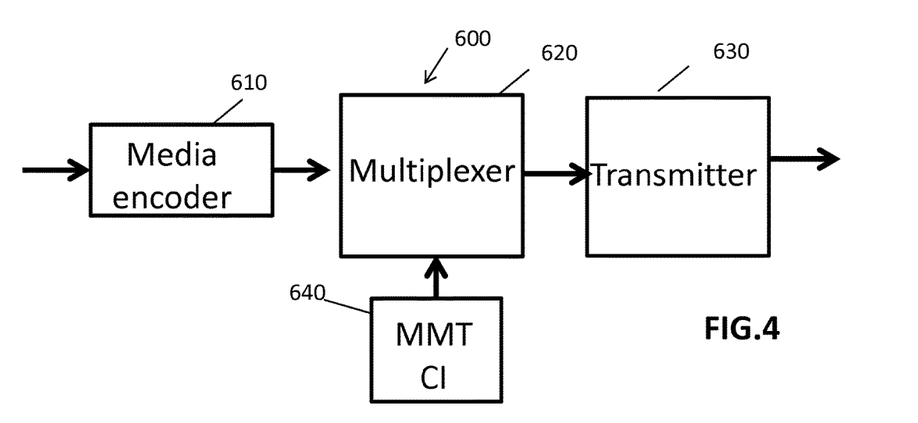
FIG. 4 is a block diagram of an example of a transmission device in which one or more embodiments of the invention can be implemented.

The server 510 is provided with an encoder for encoding video and audio streams in particular to provide a compressed bitstream for transmission that is a more compact representation of the data presented as input to the encoder. The server is further provided with a MMT CI device 550 for providing the spatial composition datasets and the temporal composition data sets The client 520 receives the transmitted bitstream and decodes the reconstructed bitstream to render the multimedia data on the client terminal. User of client 520 may modify the presentation of the multimedia content in accordance with the constraints set by the modification parameters of embodiments of the invention. The terminal is provided with a rendering agent for processing data of the spatial composition datasets and the temporal composition data sets FIG. 4 illustrates an exemplary transmitting system 600. The input media data, for example, audio and video data, are encoded at media encoder 610. The encoded data is multiplexed at multiplexer 620, and transmitted at transmitter 630. The transmitting system may be used in a typical broadcast TV environment, or may be used in a mobile device that provides audiovisual service. MMT CI module 640 sets the modification parameters, as defined in the preceding examples, for modifying the presentation of the media content as defined in the composition information.

Figure 5:
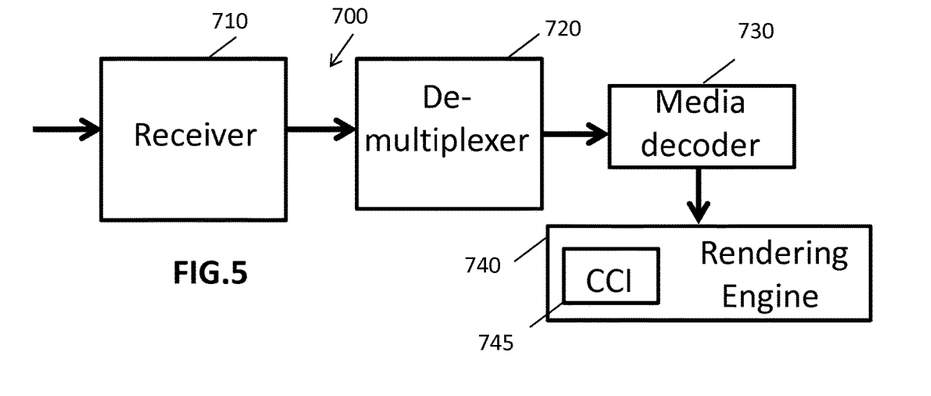
FIG. 5 is a block diagram of an example of a reception device in which one or more embodiments of the invention can be implemented.

FIG. 5 illustrates an exemplary receiving system 700. The input data of system 700 may be a transport bitstream, for example, the output of system 600. The data is received at receiver 710, de-multiplexed at de-multiplexer 720, and then decoded at media decoder 730. Decoded packets can be placed in a buffer of de-multiplexer 720. Rendering Engine 740 renders the media content in accordance with the temporal/spatial relationship defined in the MMT CI data and the modification parameters. The rendering agent is provided with a CI agent 745 for processing the spatial composition datasets and the temporal composition data sets In embodiments of the invention one or more of the following features are provided:

- multiple HTML pages are provided for each MMT package;
- a plurality of CI fragments are associated with a corresponding HTML page;
- processing of CI fragments can be made faster by highlighting views or areas that have changed between current and previous CI fragments.

In order to discriminate between different HTML pages associated with a MMT package, each HTML page is provided with a respective version identifier. In one particular embodiment of the invention versioning information is introduced into the <HEAD> section of each HTML page by using, for example, a <META> directive to create a "version" attribute; The content of the version attribute is then used by a CI agent of a rendering agent to identify the version of the HTML page.

The Version attribute may be an integer number that starts at 0 for the first page and that is incremented by 1 every time a new page is transmitted to a receiving device. In a later embodiment, the Version number may wrap around a predefined value (known to the CI agent) so that it can be used endlessly.

The following text is an illustrative example of how such a Version attribute may be added to a HTML page.

```
<!DOCTYPE html>
<html xmlns="http://www.w3.org/1999/xhtml">
    <head>
        <title>Sports</title>
        <meta name="Version" content="27"></meta>
    </head>
    <body>
        ...
    </body>
</html>
```

While CI fragments have their own version number for deprecating passed fragments, there is no solid link between a CI fragment and the HTML page. In order to associate a CI fragment with a HTML page an element identifying the HTML page with which it is associated is introduced to the CI fragment. For example, a new element "HTMLpageVersion" containing the same value as the "Version" attribute of the HTML page it is related to may be included in the CI fragment. In one embodiment of the invention the "HTMLpageVersion" element is inserted at the same level as "View" and "MediaSync" elements of the CI fragment.

The following text shows how MMT CI XML schema can be modified (text in bold) to include a new element identifying the HTML page with which it is associated by inserting the following line within the definition of the "CIType" element (see chapter A.1 in MMT-CI specification).

```
<xsd:complexType name="CIType">
    <xsd:sequence>
        <xsd:element name="HTMLpageVersion"
 type="HTMLpageVersionType" minOccurs="1" maxOccurs="1"/>
        <xsd:element name="view" type="viewType" minOccurs="1"
            maxOccurs="unbounded"/>
        <xsd:element name="MediaSync" type="MediaSyncType"
            minOccurs="0" maxOccurs="unbounded"/>
    </xsd:sequence>
</xsd:complexType>
<!-- mmtci:HTMLpageVersionType -->
<xsd:complexType name="HTMLpageVersionType">
    <xsd:complexContent>
        <xsd:extension base="html5:HTMLElementType">
            <xsd:attribute name="Version" type="xsd:positiveInteger"
                default="0"/>
        </xsd:extension>
    </xsd:complexContent>
</xsd:complexType>
<!-- mmtci:view Type -->
<xsd:complexType name="viewType">
    <xsd:complexContent>
        <xsd:extension base="html5:HTMLElementType">
            <xsd:attribute name="begin" type="beginType"
                default="0s"/>
            <xsd:attribute name="viewRole" type="viewRoleType"
                default="default"/>
        </xsd:extension>
        <!-- The view element inherits HTMLElement interface which is
 specified in 3.2.2 of[W3C HTML5]-->
    </xsd:complexContent>
</xsd:complexType>
```

Following such XML schema, a CI fragment could start, for example as follows:

```
<mmtci:CI>
    <mmtci:HTMLpageVersion mmtci:Version="27" >
    <mmtci:view id="View1" style="position:absolute; width:1920px;
        height:1080px"
mmtci:begin="0s" mmtci:end="indefinite">
    ...
```

With the introduction of Version information both to the HTML page and the CI fragments, the CI agent of the rendering engine can apply the CI fragments to the right HTML page and can therefore process several HTML pages (with different Version numbers). In order to ensure coherency, the CI agent does not apply CI fragments to other HTML pages other than the one referred to by the HTMLpageVersion element. If no HTML page can be found with a corresponding version number, the processing of the CI fragment is delayed until the right HTML page is received or a new CI fragment obsoletes current one. It may be noted that in a broadcast environment HTML pages and CI fragments would be carouselled and there would be no certainty about which one a CI agent would receive first when he joins a new service.

Whenever a CI agent receives a new CI fragment, it should apply it to the current display. The current display is the result of the application of all previously received CI fragments to the HTML page (in the order of their version number, what is also likely to be the order of reception of CI fragments).

A blunt implementation of CI agent would reapply the whole CI fragment to the initial HTML page whenever a new CI fragment is received but this would actually result in updating the whole display rather than just the part of it that has actually been modified with regards to the application of the previous CI fragments.

In some embodiments of the invention an indicator is provided to indicate which views or which areas of a view have changed from one CI fragment to a subsequent CI fragment. In one particular embodiment an attribute, referred to for example as "new", is added to the View and divLocation elements of the CI so that when the attribute is set to true the CI agent knows that the corresponding View or Area is to be modified with respect to its state in the preceding CI fragment application. Consequently, if the CI agent keeps track of the CI fragment version numbers, it can instantly know what differences to apply between two consecutive fragments (fragments with consecutive version numbers). In some cases, if the CI agent has never processed the preceding CI fragment, it shall apply changes to all elements of the CI fragments and not consider only those indicated with the "new" attribute.

With such mechanism, while consecutive CI fragments are received, the CI agent can do minimal update work on the display by only applying changes to areas or views indicated by the new attribute and whenever a CI fragment is missing in the sequence, it can update the display by applying the whole CI fragment.

Modifications defined by CI fragments may concern views or areas; Thus the new attributes may be introduced for the View and divLocation elements. The following text is an example illustrating how such attributes can be added in the XML schema definition of MMT-CI for those two elements:

<xsd:attribute name="new" type="xsd:boolean" use="optional" default="TRUE"/>

Such an attribute is optional and if it is not present for a given view or area, the CI agent must assume a change occurred for such view or area and must update the display. Therefore, a good practice is to always use this attribute and set it to TRUE or FALSE so that the CI agent knows precisely what to do with every view and area.

Figure 6:
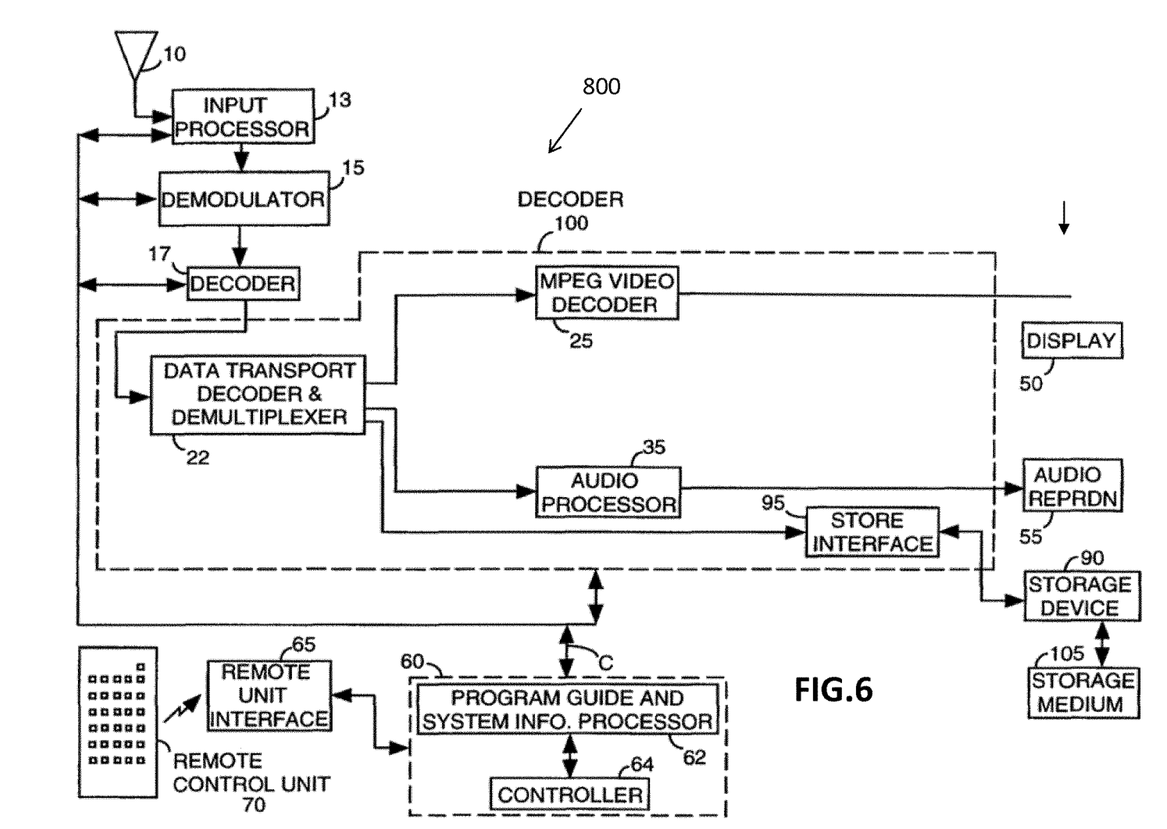
FIG. 6 is a block diagram of another example of a reception device in which one or more embodiments of the invention can be implemented.

FIG. 6 illustrates another exemplary receiving system 800 in which one or more embodiments of the invention may be implemented. In overview, in the video receiver system of FIG. 6, a broadcast carrier modulated with signals carrying audio, video and associated data representing broadcast program content is received by antenna 10 and processed by input processor 13. The resultant digital output signal is demodulated by demodulator 15. The demodulated output from unit 15 is trellis decoded, mapped into byte length data segments, deinterleaved and Reed-Solomon error corrected by decoder 17. The output data from unit 17 is in the form of an MPEG compatible transport datastream containing program representative multiplexed audio, video and data components. The transport stream from unit 17 is demultiplexed into audio, video and data components by unit 22 which are further processed by the other elements of decoder 100. In one mode, decoder 100 provides MPEG decoded data for display and audio reproduction on units 50 and 55, respectively in accordance with the temporal/spatial relationships defined by corresponding composition information in accordance with embodiments of the invention. In another mode, the transport stream from unit 17 is processed by decoder 100 to provide an MPEG compatible datastream for storage on storage medium 105 via storage device 90.

A user selects for viewing either a TV channel or an on-screen menu, such as a program guide, by using a remote control unit 70. Processor 60 uses the selection information provided from remote control unit 70 via interface 65 to appropriately configure the elements of FIG. 6 to receive a desired program channel for viewing. Processor 60 comprises processor 62 and controller 64. Unit 62 processes (i.e. parses, collates and assembles) program specific information including program guide and system information and controller 64 performs the remaining control functions required in operating decoder 100. Although the functions of unit 60 may be implemented as separate elements 62 and 64 as depicted in FIG. 6, they may alternatively be implemented within a single processor. For example, the functions of units 62 and 64 may be incorporated within the programmed instructions of a microprocessor. Processor 60 configures processor 13, demodulator 15, decoder 17 and decoder system 100 to demodulate and decode the input signal format and coding type.

Considering FIG. 6 in detail, a carrier modulated with signals carrying program representative audio, video and associated data received by antenna 10, is converted to digital form and processed by input processor 13. Processor 13 includes radio frequency (RF) tuner and intermediate frequency (IF) mixer and amplification stages for downconverting the input signal to a lower frequency band suitable for further processing.

It is assumed for exemplary purposes that a video receiver user selects a sub-channel (SC) for viewing using remote control unit 70. Processor 60 uses the selection information provided from remote control unit 70 via interface 65 to appropriately configure the elements of decoder 100 to receive the physical channel corresponding to the selected sub-channel sc.

The output data provided to processor 22 is in the form of a transport datastream containing program channel content and program specific information for many programs distributed through several sub-channels.

Processor 22 matches the Packet Identifiers (PIDs) of incoming packets provided by decoder 17 with PID values of the video, audio and sub-picture streams being transmitted on sub-channel sc. These PID values are pre-loaded in control registers within unit 22 by processor 60. Processor 22 captures packets constituting the program transmitted on sub-channel SC and forms them into MPEG compatible video, audio data streams for output to video decoder 25, audio decoder 35 respectively. The video and audio streams contain compressed video and audio data representing the selected sub-channel SC program content.

Decoder 25 decodes and decompresses the MPEG compatible packetized video data from unit 22 and provides decompressed program representative pixel data to device 50 for display. Similarly, audio processor 35 decodes the packetized audio data from unit 22 and provides decoded audio data, synchronized with the associated decompressed video data, to device 55 for audio reproduction.

The MPEG data can be rendered in accordance with the temporal/spatial relationships defined by corresponding composition information in the spatial composition datasets for each MMT packet and the temporal composition data sets for each spatial composition data sets of embodiments of the invention.

In a storage mode of the system of FIG. 6, the output data from unit 17 is processed by decoder 100 to provide an MPEG compatible datastream for storage. In this mode, a program is selected for storage by a user via remote unit 70 and interface 65.

Processor 60, in conjunction with processor 22 forms a composite MPEG compatible datastream containing packetized content data of the selected program and associated program specific information. The composite datastream is output to storage interface 95. Storage interface 95 buffers the composite datastream to reduce gaps and bit rate variation in the data. The resultant buffered data is processed by storage device 90 to be suitable for storage on medium 105. Storage device 90 encodes the buffered datastream from interface 95 using known error encoding techniques such as channel coding, interleaving and Reed Solomon encoding to produce an encoded datastream suitable for storage. Unit 90 stores the resultant encoded datastream incorporating the condensed program specific information on medium 105.

Embodiments of the invention described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, tablets, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Although the present invention has been described hereinabove with reference to specific embodiments, the present invention is not limited to the specific embodiments, and modifications will be apparent to a skilled person in the art which lie within the scope of the present invention.

For instance, while the foregoing examples have been described with respect to MMT assets it will be appreciated that the invention may be applied to other forms of media entities or components, or other forms of data.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method of transmitting data for a media package, the media package comprising media data of one or more media entities for rendering on a display; the method comprising:
    transmitting, for each media package, Composition Information (CI) fragments, at least one spatial composition data set, the or each spatial composition data set forming an HTML page defining a respective initial spatial rendering of one or more media entities on a display, each HTML page including a version number and each CI fragment including an element identifying a respective related HTML page; and, for each spatial composition data set, at least one corresponding temporal composition data set, the or each corresponding temporal composition data set being XML data and defining a temporal synchronization of said one or more media entities on the display,
    wherein said one or more media entities are rendered in a view of the display, each view being time dependent, wherein an attribute is added to the at least one temporal composition data set when a corresponding view has changed with respect to a view defined in a preceding temporal composition dataset, thereby, based on the version number of the CI fragment for which the attribute is added, identifying consecutive CI fragments and differences to be applied between consecutive fragments, said version numbers for each HTML page and identifying element of each CI fragment enabling application of CI fragments to respective HTML pages and processing of a plurality of HTML pages including different version numbers.

2. A non-transitory storage media having a computer program product for a programmable apparatus stored thereon, the computer program product comprising a sequence of instructions for implementing the method according to claim 1 when loaded into and executed by the programmable apparatus.

3. A method of processing data of a media package, the media package comprising media data of one or more media entities for rendering on a display; the method comprising:
    obtaining:
        for each media package, Composition Information (CI) fragments, at least one spatial composition data set, the or each spatial composition data set forming an HTML page defining an initial spatial rendering of said one or more media entities on a display, each HTML page including a version number and each CI fragment including an element identifying a respective related HTML page, and, for each spatial composition data set, at least one corresponding temporal composition data set, the or each corresponding temporal composition data set being XML data and defining a temporal synchronization of said one or more media entities on the display; the method further comprising rendering the one or more media entities in accordance with the at least one spatial composition data sets and the corresponding temporal composition data set, wherein said one or more media entities are rendered in a view of the display, each view being time dependent, wherein an attribute is added to the at least one temporal composition data set when a corresponding view has changed with respect to a view defined in a preceding temporal composition dataset, thereby, based on the version number of the CI fragment for which the attribute is added, identifying consecutive CI fragments and differences to be applied between consecutive fragments, said version numbers for each HTML page and identifying element of each CI fragment enabling application of CI fragments to respective HTML pages and processing of a plurality of HTML pages including different version numbers.

4. The method according to claim 3, wherein a plurality of spatial composition data sets are transmitted for the media package, each spatial composition data set defining a respective initial spatial rendering of media entities of the media package.

5. The method according to claim 3, wherein each view of the one or more media entities is composed of at least one display region wherein the temporal composition data set includes an indicator indicating that a display region has changed with respect to a display region defined in the preceding temporal composition dataset.

6. The method according to claim 3, wherein each spatial composition dataset has a respective identifier for linking with each corresponding temporal composition data set.

7. The method according to claim 6, wherein each respective identifier is included in a header of a respective spatial composition dataset.

8. The method according to claim 6, wherein each temporal composition data set includes an identifier of the corresponding spatial composition dataset.

9. The method according to claim 6, wherein each temporal composition dataset is a CI fragment and the identifier of the corresponding spatial composition dataset is inserted into the CI fragment at a same level as view and media sync elements of the CI fragment.

10. The method according to claim 6, wherein each temporal composition data set is only processed for rendering of the media entities if the corresponding spatial composition dataset indicated by the respective identifier is received.

11. A transmission device for transmitting a media package, the media package comprising media data of one or more media entities for rendering on a display; the device comprising:
an encoder configured to encode the media data and, for each media package, Composition Information (CI) fragments, at least one spatial composition data set, the or each spatial composition data set forming an HTML page defining the initial spatial rendering of one or more media entities of the media package on a display, each HTML page including a version number and each CI fragment including an element identifying a respective related HTML page, and, for each spatial composition data set, at least one corresponding temporal composition data set, the or each corresponding temporal composition data set being XML data and defining a temporal synchronization of said one or more media entities on the display;
a multiplexer for multiplexing the encoded media data; and
a transmitter for transmitting the encoded media data for rendering on the display,
wherein said one or more media entities are rendered in a view of the display, each view being time dependent, wherein an attribute is added to the at least one temporal composition data set when a corresponding view has changed with respect to a view defined in a preceding temporal composition dataset, thereby, based on the version number of the CI fragment for which the attribute is added, identifying consecutive CI fragments and differences to be applied between consecutive fragments, said version numbers for each HTML page and identifying element of each CI fragment enabling application of CI fragments to respective HTML pages and processing of a plurality of HTML pages including different version numbers.

12. A device for processing a media package, the media package comprising media data of one or more media entities for rendering on a display; the device comprising:
a receiver for receiving data associated with a media package
a demultiplexer for extracting from the received data:
for each media package, Composition Information (CI) fragments, at least one spatial composition data set, the or each spatial composition data set forming an HTML page defining a respective initial spatial rendering of one or more media entities of the media package on a display, each HTML page including a version number and each CI fragment including an element identifying a respective related HTML page, and, for each spatial composition data set, at least one corresponding temporal composition data set, the or each corresponding temporal composition data set being XML data and defining a temporal synchronization of said one or more media entities on the display;
a rendering engine for rendering the one or more media entities in accordance with the one or more spatial composition data sets and the corresponding temporal composition data sets,
wherein said one or more media entities are rendered in a view of the display, each view being time dependent, wherein an attribute is added to the at least one temporal composition data set when a corresponding view has changed with respect to a view defined in a preceding temporal composition dataset, thereby, based on the version number of the CI fragment for which the attribute is added, identifying consecutive CI fragments and differences to be applied between consecutive fragments, said version numbers for each HTML page and identifying element of each CI fragment enabling application of CI fragments to respective HTML pages and processing of a plurality of HTML pages including different version numbers.

13. The device according to claim 12 wherein each spatial composition dataset has a respective version identifier for linking with each corresponding temporal composition data set.

14. The device according to claim 12, for processing a media package comprising media data of one or more media entities, further comprising a display for rendering the media entities.

15. A non-transitory processor readable medium having stored thereon a media data package for execution by a processor, the media data package comprising:

media data of one or more media entities for rendering on a display;

Composition Information (CI) fragments, at least one spatial composition dataset, the or each spatial composition dataset forming an HTML page and comprising spatial composition data defining a respective initial spatial rendering of said one or more media entities, each HTML page including a version number and each CI fragment including an element identifying a respective related HTML page, and, for each spatial composition dataset: at least one corresponding temporal composition data set, the or each corresponding temporal composition data set being XML data and defining a temporal synchronization of said one or more media entities of the media data, wherein, when said media data package is executed by the processor, said one or more media entities are rendered in a view of the display, each view being time dependent, wherein an attribute is added to the at least one temporal composition data set when a corresponding view has changed with respect to a view defined in a preceding temporal composition dataset, thereby, based on the version number of the CI fragment for which the attribute is added, identifying consecutive CI fragments and differences to be applied between consecutive fragments, said version numbers for each HTML page and identifying element of each CI fragment enabling application of CI fragments to respective HTML pages and processing of a plurality of HTML pages including different version numbers.

* * * * *